(12) United States Patent
Bernal et al.

(10) Patent No.: US 10,388,005 B2
(45) Date of Patent: *Aug. 20, 2019

(54) SENSOR SYSTEM FOR DATA ENHANCEMENT

(71) Applicant: UNITED TECHNOLOGIES CORPORATION, Farmington, CT (US)

(72) Inventors: Edgar A. Bernal, Webster, NY (US); Kishore K. Reddy, Vernon, CT (US); Michael J. Giering, Bolton, CT (US); Ryan B. Noraas, Hartford, CT (US); Kin Gwn Lore, Manchester, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/807,359

(22) Filed: Nov. 8, 2017

(65) Prior Publication Data
US 2019/0050973 A1 Feb. 14, 2019

Related U.S. Application Data

(60) Provisional application No. 62/544,590, filed on Aug. 11, 2017.

(51) Int. Cl.
*G06T 5/20* (2006.01)
*G06T 5/10* (2006.01)
(Continued)

(52) U.S. Cl.
CPC .............. *G06T 5/20* (2013.01); *G06K 9/6256* (2013.01); *G06T 5/10* (2013.01); *H04N 5/23229* (2013.01);
(Continued)

(58) Field of Classification Search
CPC ..... G06T 5/20; G06T 2207/2008; G06T 5/10; H04N 5/23229; H04N 7/181;
(Continued)

(56) References Cited

U.S. PATENT DOCUMENTS 6,714,925 B1 * 3/2004 Barnhill ............... G06K 9/6228
706/48
6,754,380 B1 * 6/2004 Suzuki ..................... G06K 9/32
382/156

(Continued)

FOREIGN PATENT DOCUMENTS

| EP | 0877309 | 11/1998 |
| EP | 1367248 | 12/2003 |
| WO | 2016100814 | 6/2016 |

OTHER PUBLICATIONS

European Patent Office, European Search Report dated Nov. 21, 2018 in Application No. 18184761.7-1208.

(Continued)

*Primary Examiner* — Yon J Couso
(74) *Attorney, Agent, or Firm* — Snell & Wilmer, L.L.P.

(57) ABSTRACT

A sensor system may comprise a sensor; a processor in electronic communication with the sensor; and/or a tangible, non-transitory memory configured to communicate with the processor, the tangible, non-transitory memory having instructions stored thereon that, in response to execution by the processor, cause the processor to perform operations. The operations may comprise recording, by the sensor, a low quality data sample; and/or applying, by the processor, a mapping function having a plurality of tuned parameters to the low quality data sample, producing a high quality data output.

17 Claims, 3 Drawing Sheets

(51) Int. Cl.
*H04N 5/232* (2006.01)
*G06K 9/62* (2006.01)
*H04N 7/18* (2006.01)

(52) U.S. Cl.
CPC ... *H04N 7/181* (2013.01); *G06T 2207/20081* (2013.01)

(58) Field of Classification Search
CPC .... G06K 9/6256; G06K 9/6262; G06N 20/00; G06N 3/08; G06N 3/0454; G06N 99/005
See application file for complete search history.

(56) References Cited

U.S. PATENT DOCUMENTS

| | | | | |
|---|---|---|---|---|
| 8,825,682 | B2 * | 9/2014 | Kishi | G06F 17/30247 358/1.17 |
| 2004/0135788 | A1 | 7/2004 | Davidson | |
| 2011/0313953 | A1 | 12/2011 | Lane et al. | |
| 2016/0178355 | A1 | 6/2016 | Ge et al. | |
| 2016/0224858 | A1 | 8/2016 | Chen | |

OTHER PUBLICATIONS

Fengzhi Pan: "New image super-resolution scheme based on residual error restoration by neural networks", Optical Engineering., vol. 42, No. 10, Oct. 1, 2003 (Oct. 1, 2003), pp. 3038-3046.

Qu Yanyun et al: "Single Image Super-Resolution via Convolutional Neural Network and Total Variation Regularization", Jan. 1, 2016 (Jan. 1, 2016), International Conference on Simulation, Modeling, and Programming for Autonomous Robots,SIMPAR 2010; [Lecture Notes in Computer Science; Lect.Notes Computer], Springer, Berlin, Heidelberg, p. 28-38.

Kim Jiwon et al: Accurate Image Super-Resolution Using Very Deep Convolutional Networks11 , 2016 IEEE Conference on Computer Vision and Pattern Recognition (CVPR), IEEE, Jun. 27, 2016 (Jun. 27, 2016), pp. 1646-1654.

Yudong Liang et al: "Single Image Super-resolution with a Parameter Economic Residual-like Convolutional Neural Network", Arxiv. org, Cornell University Library, 201 Olin Library Cornell University Ithaca, NY 14853, Mar. 23, 2017.

Reddy et al., U.S. Appl. No. 15/840,132, filed Dec. 13, 2017 entitled "Sensor System for Transcoding Data".

USPTO, Pre-Interview First Office Action dated Jan. 2, 2019 in U.S. Appl. No. 15/840,132.

European Patent Office, European Search Report dated Jan. 7, 2019 in Application No. 18187113.8.

USPTO, First Action Interview Office Action dated Feb. 28, 2019 in U.S. Appl. No. 15/840,132.

USPTO, Notice of Allowance dated May 22, 2019 in U.S. Appl. No. 15/840,132.

* cited by examiner

SENSOR SYSTEM FOR DATA ENHANCEMENT

CROSS-REFERENCE TO RELATED APPLICATION

This application is a Non-Provisional of, and claims priority to, and the benefit of U.S. Provisional Application No. 62/544,590 filed Aug. 11, 2017 and entitled "SENSOR SYSTEM FOR DATA ENHANCEMENT," which is hereby incorporated by reference in its entirety.

FIELD

The present disclosure relates to a sensor system for enhancing data to produce higher quality data or data with higher accuracy, sensitivity, range, and/or resolution.

BACKGROUND

Sensors, recorders, or other devices configured to capture or record data of a surrounding environment (collectively, "sensors") may be used in various implementations such as personal use, use on a vehicle for surveying purposes, or the like. However, high quality ("HQ") sensors that provide higher quality data reflecting the surroundings being recorded (e.g., higher resolution images or videos), may be more expensive. Low quality ("LQ") sensors that provide lower quality data reflecting the surroundings being recorded are less expensive than HQ sensors, but LQ sensors may not provide the detail (e.g., in terms of accuracy, sensitivity, range, or resolution) desired for the task for which the sensor is used.

SUMMARY

In various embodiments, a method may comprise determining, by a processor, a plurality of tuned parameters of a mapping function. Determining the plurality of tuned parameters may comprise initializing, by the processor, a plurality of tunable parameters in the mapping function configured to be applied to a first training low quality data sample; applying, by the processor, the mapping function having the plurality of tunable parameters to a plurality of first training low quality data inputs comprised in the first training low quality data sample, producing a first training output; comparing, by the processor, the first training output to a first training high quality data sample associated with the first training low quality data sample; calculating, by the processor, a first difference between the first training output and the first training high quality data sample; and/or adjusting, by the processor, the plurality of tunable parameters in the mapping function to decrease the first difference between the first training output and the first training high quality data sample.

In various embodiments, the adjusting the plurality of tunable parameters produces a plurality of first adjusted parameters of the mapping function. Determining the plurality of tuned parameters may further comprise applying, by the processor, the mapping function having the plurality of first adjusted parameters to a plurality of second training low quality data inputs comprised in a second training low quality data sample, producing a second training output; comparing, by the processor, the second training output to a second training high quality data sample associated with the second training low quality data sample; calculating, by the processor, a second difference between the second training output and the second training high quality data sample; and/or adjusting, by the processor, the plurality of first adjusted parameters in the mapping function to decrease the second difference between the second training output and the second training high quality data sample.

In various embodiments, applying the mapping function having the plurality of tunable parameters to the plurality of first training low quality data inputs may comprise applying, by the processor, the mapping function to a first training low quality data input, producing a first training output data point. In various embodiments, comparing the first training output to the first training high quality data sample may comprise comparing, by the processor, the first training output data point to a first training high quality data point comprised in the first training high quality data sample. In various embodiments, calculating the first difference may comprise calculating, by the processor, a first data point difference between the first training output data point and the first training high quality data point. In various embodiments, the first difference may reflect at least one of a single value difference between the first training output and the first training high quality data sample, and a distribution difference between an output distribution of values of the first training output and a high quality data sample distribution of values of the first high quality data sample. In various embodiments, adjusting the plurality of tunable parameters may comprise adjusting, by the processor, values of the plurality of tunable parameters to decrease the first data point difference between the first training output data point and the first training high quality data point.

In various embodiments, the method may further comprise applying, by the processor, the mapping function having the plurality of tuned parameters to the low quality data sample, producing the high quality data output. Applying the mapping function having the plurality of tuned parameters to the low quality data sample may comprise applying, by the processor, the mapping function having the plurality of tuned parameters to a first low quality data input comprised in the low quality data sample, producing a first high quality data output data point; and/or applying, by the processor, the mapping function having the plurality of tuned parameters to a second low quality data input comprised in the low quality data sample, producing a second high quality data output data point. Producing the high quality data output may comprise combining, by the processor, the first high quality data output data point and the second high quality data output data point, wherein the high quality data output comprises the first high quality data output data point and the second high quality data output data point.

In various embodiments, the low quality data sample may comprise a recording. In various embodiments, the first low quality data input may be a first data point of the recording, and the second low quality data input may be a second data point of the recording. In various embodiments, the recording may comprise at least one of a video recording, a time series recording, or a still image recording.

In various embodiments, a system may comprise a sensor; a processor in electronic communication with the sensor; and/or a tangible, non-transitory memory configured to communicate with the processor, the tangible, non-transitory memory having instructions stored thereon that, in response to execution by the processor, cause the processor to perform operations. The operations may comprise recording, by the sensor, a low quality data sample; and/or applying, by the processor, a mapping function having a plurality of tuned parameters to the low quality data sample, producing a high quality data output. In various embodiments, applying the mapping function having the plurality of tuned parameters to the low quality data sample may comprise applying, by the processor, the mapping function having the plurality of tuned parameters to a first low quality data input comprised in the low quality data sample, producing a first high quality data output data point; and/or applying, by the processor, the mapping function having the plurality of tuned parameters to a second low quality data input comprised in the low quality data sample, producing a second high quality data output data point. Producing the high quality data output may comprise combining, by the processor, the first high quality data output data point and the second high quality data output data point, wherein the high quality data output may comprise the first high quality data output data point and the second high quality data output data point.

In various embodiments, the low quality data sample may comprise a recording. In various embodiments, the first low quality data input may be a first data point of the recording, and the second low quality data input may be a second data point of the recording. In various embodiments, the recording may comprise at least one of a video recording, a time series recording, or a still image recording.

In various embodiments, the operations may further comprise determining, by the processor, the plurality of tuned parameters of the mapping function configured to modify the low quality data sample before the applying the mapping function having the plurality of tuned parameters to the low quality data sample. In various embodiments, determining the plurality of tuned parameters may comprise initializing, by the processor, a mapping function having a plurality of tunable parameters configured to be applied to a first training low quality data sample; applying, by the processor, the mapping function having the plurality of tunable parameters to a plurality of first training low quality data inputs comprised in the first training low quality data sample, producing a first training output; comparing, by the processor, the first training output to a first training high quality data sample associated with the first training low quality data sample; calculating, by the processor, a first difference between the first training output and the first training high quality data sample; and/or adjusting, by the processor, the plurality of tunable parameters in the mapping function to decrease the first difference between the first training output and the first training high quality data sample.

In various embodiments, applying the mapping function having the plurality of tunable parameters to the plurality of first training low quality data inputs may comprise applying, by the processor, the mapping function having a first set of tunable parameters of the plurality of tunable parameters to a first training low quality data input, producing a first training output data point. Comparing the first training output to the first training high quality data sample may comprise comparing, by the processor, the first training output data point to a first training high quality data point comprised in the first training high quality data sample. In various embodiments, calculating the first difference may comprise calculating, by the processor, a first data point difference between the first training output data point and the first training high quality data point. The adjusting the plurality of tunable parameters may comprise adjusting, by the processor, the first set of tunable parameters of the mapping function to decrease the first data point difference between the first training output data point and the first training high quality data point.

In various embodiments, an article of manufacture including a non-transitory, tangible computer readable storage medium having instructions stored thereon that, in response to execution by a processor, may cause the processor to perform operations. The operations may comprise determining a plurality of tuned parameters of a mapping function configured to modify a low quality data sample, wherein the processor is configured to apply the mapping function having the plurality of tuned parameters to the low quality data sample to produce a high quality data output. In various embodiments, determining the plurality of tuned parameters comprises initializing a plurality of tunable parameters in the mapping function configured to be applied to a first training low quality data sample; applying the mapping function having the plurality of tunable parameters to a plurality of first training low quality data inputs comprised in the first training low quality data sample, producing a first training output; comparing the first training output to a first training high quality data sample associated with the first training low quality data sample; calculating a first difference between the first training output and the first training high quality data sample; and/or adjusting the plurality of tunable parameters in the mapping function to decrease the first difference between the first training output and the first training high quality data sample.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Sensors are devices that measure physical properties of an environment and produce an output signal which is representative of the measured property of the environment. Examples of sensors include imaging sensors such as those commonly found in a still or video camera, which are often coupled to optics and produce an image of a given scene; time series sensors (e.g., audio sensors) such as microphones which operate by detecting differences in air pressure and transforming them into electrical signals; motion or inertial sensors such as accelerometers, which measure the acceleration they are subject along one or more axes of motion. We refer to the differences between the data captured by different sensor types as data modalities; namely, audio is one data modality while video is a different data modality. Note that different sensors may produce identical or different data modalities. The performance or quality of a sensor can be measured in terms of metrics including sensitivity (i.e., how much the amplitude of the signal output changes as the property being measured changes), range (i.e., the maximum and minimum values of the property that can be measured), resolution (i.e., the smallest detectable change in the property that can be detected), accuracy (i.e., the maximum difference between the property being measured and the corresponding sensor output), among others.

Figure 1A:
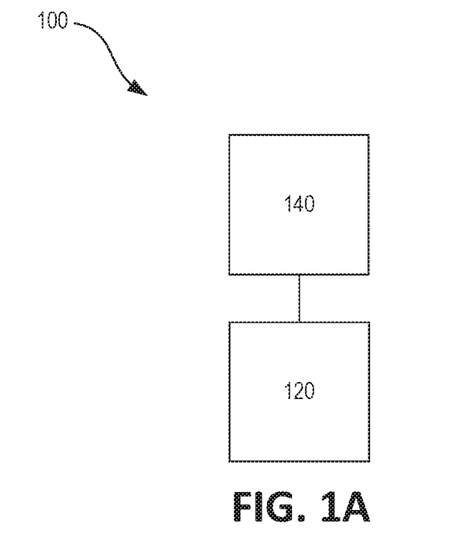
FIG. 1A illustrates a block diagram of a sensor system, in accordance with various embodiments.

With reference to FIG. 1A, a block diagram of a sensor system 100 is illustrated, in accordance with various embodiments. Sensor system 100 may comprise a processor 120 in electronic communication with a first sensor 140. Sensor system 100 may be configured to capture low quality (LQ) data via a LQ sensor (e.g., first sensor 140), and via processor 120, enhance the LQ data to produce high quality (HQ) output data (e.g., data resembling that which that may have been captured by a HQ sensor). Therefore, system 100 may be referred to as a virtual sensor because instead of directly measuring environmental properties with a HQ sensor, sensor system 100 utilizes processor 120 to enhance LQ data into HQ data output.

Figure 1B:
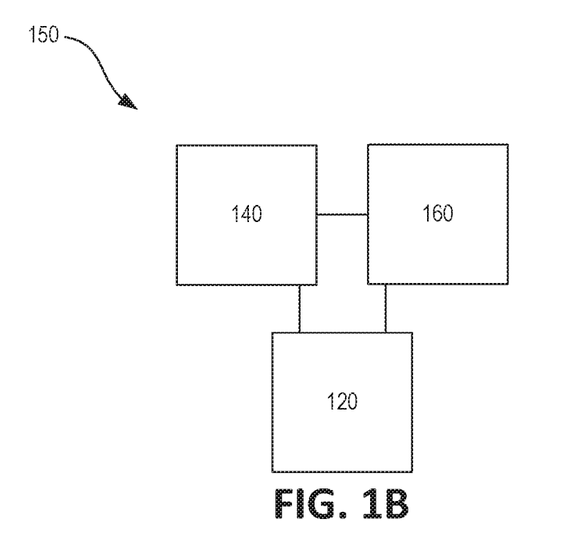
FIG. 1B illustrates a block diagram of a sensor training system, in accordance with various embodiments.

In various embodiments, processor 120 may be comprised in first sensor 140 and/or second sensor 160 (depicted in FIG. 1B). Processor 120 may be configured to operate as a data acquisition and digital signal processing system. For example, processor 120 may receive data acquired by first sensor 140 and/or second sensor 160. Such data may be processed, stored, and/or analyzed by processor 120. In various embodiments, processor 120 may comprise an analog to digital converter, which may be configured to receive analog data acquired by first sensor 140 and/or second sensor 160 and convert it to digital data for processing by processor 120.

In various embodiments, processor 120 may be configured to implement various logical operations in response to execution of instructions, for example, instructions stored on a non-transitory, tangible, computer-readable medium. In various embodiments, the transitory, tangible, computer-readable medium and/or processor 120 may be comprised in an article of manufacture. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. In various embodiments, the processor may be configured to implement smart algorithms to enhance LQ data to produce HQ data output. The LQ data sample received by processor 120 may be said to be a lower-dimensional equivalent to the HQ data output. Analogously, the HQ data output produced by processor 120 may be said to an enhanced version of the LQ data sample.

In various embodiments, in order to get sensor system 100 and processor 120 to be able to process LQ data captured by first sensor 140 into HQ data output, processor 120 first may be trained to do so. Training processor 120 may comprise teaching processor 120 to operate on inputs of LQ data, and apply at least one transformation or mapping function expressed in terms of tuned parameters to the inputs of LQ data to produce outputs resembling corresponding HQ data (i.e., HQ data output). That is, the mapping function may comprise tuned (or tunable) parameters. Therefore, training the processor 120 to enhance LQ data to produce HQ data output may comprise determining the tuned parameters of the transformation or mapping function to be applied to the LQ data.

In various embodiments, sensor training system 150 in FIG. 1B may be utilized to train processor 120 to enhance LQ data from first sensor 140 to produce HQ data output resembling data from a second sensor 160. Sensor training system 150 may comprise processor 120, first sensor 140, and second sensor 160. Second sensor 160 may be in electronic communication with first sensor 140 and/or processor 120. In various embodiments, first sensor 140 may be a LQ sensor, meaning, sensor 140 captures LQ data representing the surrounding environment (e.g., visual environment, audio environment, and/or the like), the LQ data being of low quality (e.g., low sensitivity, accuracy, range, resolution). In various embodiments, second sensor 160 may be a HQ sensor, meaning, second sensor 160 captures HQ data representing the surrounding environment, the HQ data being higher quality (e.g., comparatively higher sensitivity, accuracy, range, resolution) than the LQ data captured by first sensor 140. In various embodiments, the data quality, or resolution, may refer to bandwidth, or the amount of data able to be captured at a time (e.g., for still images, the number of pixels per capture; for video, the frames per second or video data bitrate (i.e., video data bits per second captured); for audio recordings, the audio bitrate (i.e., audio data bits per second captured), and/or the like. First sensor 140 and/or second sensor 160 may be any suitable device to capture data of the surrounding environment such as a time series sensor (e.g., audio sensor), video sensor, still image sensor (e.g., a camera), motion sensor, and/or a sensor to detect the characteristics of the surrounding environment.

Figure 2:
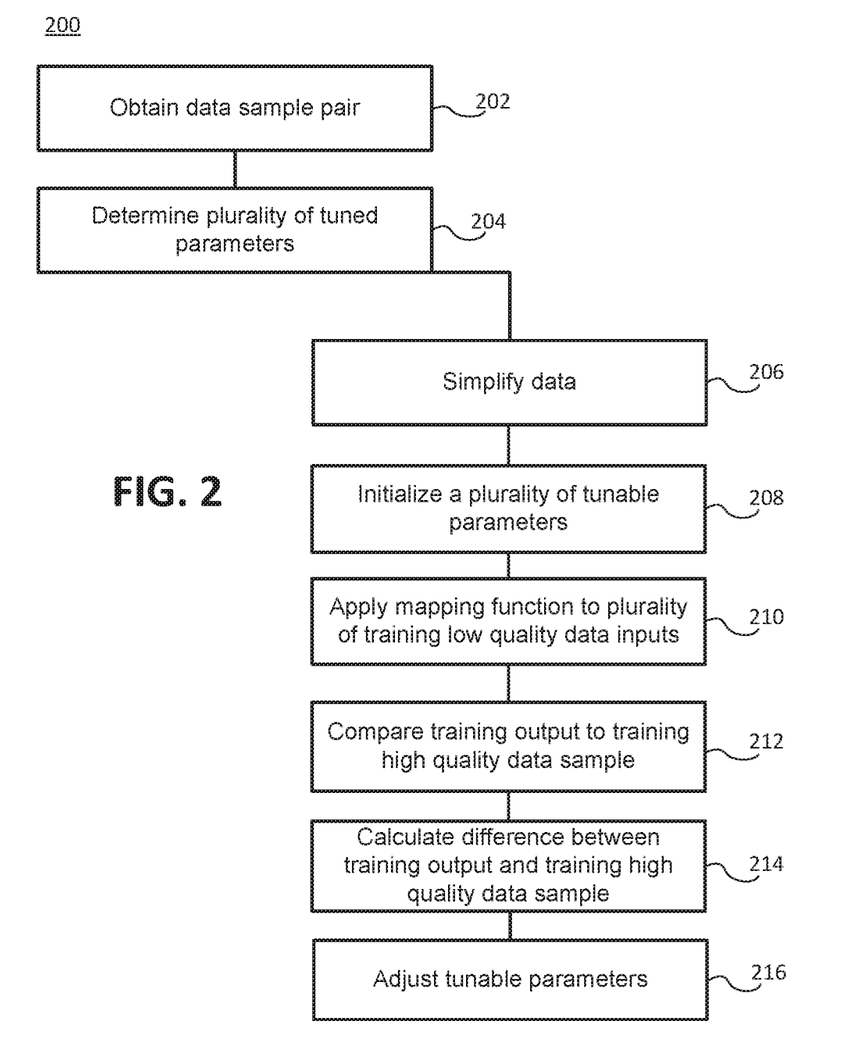
FIG. 2 illustrates a method for determining tuned parameters, in accordance with various embodiments.

In accordance with various embodiments, FIG. 2 depicts a method 200 for determining tuned parameters of the mapping function, which processor 120 may apply to LQ data to enhance the LQ data. In various embodiments, with combined reference to FIGS. 1B and 2, processor 120 may obtain a data sample pair (step 202) comprising a training LQ data sample, representing an environment, and a corresponding training HQ data sample representing the same environment as the training LQ data sample. For example, first sensor 140 may capture a first still image (i.e., the LQ data sample) of an environment having one megapixel in resolution (one million pixels), which may be LQ data because higher resolution may be available (e.g., data captured by a HQ sensor). Second sensor 160 may capture a second still image (i.e., the corresponding training HQ data sample) of the same environment as first sensor 140, but the image from second sensor 160 may comprise HQ data (i.e., higher quality than the LQ data from first sensor 140). The first still image captured by first sensor 140 and the second still image captured by second sensor 160 may be of exactly the same environment, such that the first still image is simply a less resolved version of the second still image. In various embodiments, processor 120 may receive the first still image from first sensor 140 and the second still image from second sensor 140. In various embodiments, processor 120 may receive numerous (e.g., thousands) of data sample pairs from first sensor 140 and second sensor 160, each data sample pair comprising a training LQ data sample and a training HQ data sample representing the same environment.

Processor 120 may determine the tuned parameters (comprised in the mapping function) (step 204) required to enhance LQ data into data resembling HQ data by utilizing the data sample pairs captured by sensor training system 150. There may be a different set of tuned parameters for every data type or modality (e.g., a plurality of tuned parameters for enhancing data for a still image, a plurality of tuned parameters for enhancing data for an audio recording, a plurality of tuned parameters for enhancing data for a video recording, etc.). Therefore, in various embodiments, processor 120 may receive data sample pairs of LQ and HQ audio recordings, video recordings, images, or the like. For example, first sensor 140 may capture a first video having temporal resolution of five frames per second (LQ data sample), and second sensor 160 may capture a second video of the same spatio-temporal event as first sensor 140, but the second video may have temporal resolution of 30 frames per second (HQ data sample). In various embodiments, the data sample pairs captured by first sensor 140 and second sensor 160 may comprise multiple data types, for example the data sample pairs may comprise audio and visual data. Going forward, the explanation of method 200 will be in relation to still images, but it should be understood that method 200 could be applied to any suitable data type, such as those discussed herein, including time series data (e.g., audio data).

In various embodiments, in each data sample pair, the training LQ data sample may comprise training LQ data inputs and the training HQ data sample may comprise training HQ data inputs. The data inputs may comprise data points of the data samples in which the data inputs are comprised. For example, a pixel and/or a group of pixels may be a training LQ data input from the LQ still image (i.e., the training LQ data sample). A pixel and/or a group of pixels may be a training HQ data point from the HQ still image (i.e., the training HQ data sample). Continuing with the example above with a training LQ data sample and a training HQ data sample representing still images, processor 120 may simplify the data (step 206) comprised in the training LQ data sample (the LQ data inputs) and/or the training HQ data sample (the HQ data points). For example, processor 120 may take the one million pixels (i.e., one million data points or LQ data inputs) of the training LQ data sample from first sensor 140, and reduce the one million data points to a smaller number of data points on the first step of a multi-step mapping function. The training LQ data inputs may be simplified by passing data points (i.e., LQ data inputs) of the training LQ data sample through a series of non-linear mapping functions (e.g., polynomial functions, exponential functions, sigmoidal functions, piecewise linear functions, and/or the like), resulting in a lower dimensional space representation (i.e., simplified data inputs) that may fully capture the statistics of the input data sample (the LQ data sample). The lower dimensional space representation in which simplified data inputs lie may be referred to as an intermediate low-dimensional space. In a similar manner, in various embodiments, processor 120 may simplify the two million pixels (i.e., HQ data points of the training HQ data sample from second sensor 160), and reduce the two million data point pixel representation to a representation involving fewer data points, lying on a different intermediate low-dimensional space.

In various embodiments, the mapping function that maps (i.e., enhances) LQ input data into data resembling HQ data may have multiple steps comprising a first mapping from the input low-dimensional space to a first intermediate low-dimensional space, a second mapping from the first intermediate low-dimensional space to a second low-dimensional space, and a third mapping from the second low-dimensional space to the high dimensional space corresponding to HQ output data. In various embodiments, the number of intermediate spaces and mappings may vary. In various embodiments, the stage of mapping the final low-dimensional space to the high dimensional space may comprise an inverse function of the aforementioned mapping function from the HQ output space into the second low-dimensional space in order to enhance the low-dimensional space to the high dimensional space. In various embodiments, relating to a still image, for example, the intermediate spaces may represent high-level abstractions of pixel data. In various embodiments, the intermediate spaces may represent probability density functions describing the distribution of pixel values. In response to the intermediate spaces capturing the statistical nature of the data, the mapping that produces HQ data may consist of a non-linear mapping function that performs density sampling.

In various embodiments, at least some of the data sample pairs comprising associated LQ and HQ data samples, of the data sample pairs received by processor 120, may be used to determine the tunable parameters in the mapping functions. In various embodiments, the number of data points the training HQ data sample is reduced to (i.e., HQ data points) may equal the reduced number of training LQ data sample data points (i.e., LQ data inputs). The data points of a training LQ data sample, whether raw or simplified data, may be referred to as "training LQ data inputs." The data points of a training HQ data sample, may be referred to as "training HQ data points." Each training LQ data input(s) may be associated with a corresponding training HQ data point(s). In various embodiments, processor 120 may not simplify data comprised in the training LQ data sample (the LQ data inputs) and/or the training HQ data sample (the HQ data points).

In various embodiments, the tunable parameters of the mapping function may be initialized (step 208) (i.e., given an initial value or weight) in any suitable manner, for example, randomly. Processor 120 may initialize the tunable parameters. Processor 120 may begin by processing a first data sample pair (comprising a (first) training LQ data sample and a (first) training HQ data sample). Processor 120 may apply the mapping function having the tunable parameters to the training LQ data inputs (step 210) comprised in the training LQ data sample, producing a first training output. Accordingly, in various embodiments, applying the mapping function having the tunable parameters to the training LQ data inputs may comprise processor 120 applying a mapping function having a first set of tunable parameters to a first training LQ data input (for example, at least a portion or data point of a still image) producing a first training output data point. In various embodiments, determining the tuned parameters (i.e., tunable parameters having an optimal value(s)) of a mapping function may be an iterative process. Therefore, applying the mapping function having the tunable parameters to the training LQ data inputs may further comprise processor 120 applying a mapping function having a second set of tunable parameters to a second training LQ data input producing a second training output data point, applying a mapping function having a third set of tunable parameters to a third training LQ data input producing a third training output data point, and so on until at least a desired fraction of the training LQ data inputs are manipulated by various mapping functions. In various embodiments, the same mapping function having a set of tunable parameters may be applied to many or all, or at least a portion of, training LQ data inputs of a training LQ data sample (i.e., the first training LQ data input, the second training LQ data input, and/or the third training LQ data input may be modified by the mapping function with the same tunable parameter(s) to produce the first, second, and third training output data points, respectively).

In various embodiments, producing the first training output (via processor's 120 application of the mapping function having the tunable parameters to the first training LQ data inputs) may comprise combining the training output data points (e.g., the first training output data point, second training output data point, third training output data point, etc.). That is, in various embodiments, the tunable parameters may be adjusted after processing a group of data points. In various embodiments, the iterative updates may be performed in accordance with Newton's method, coordinate descent methods, conjugate gradient descent methods, gradient descent methods, genetic algorithms, and the like. In various embodiments, the mapping functions having tunable parameters (or tuned parameters) may be implemented in the form of a feedforward neural network, a convolutional neural network, an autoencoder, a convolutional autoencoder, a recurrent neural network, a recurrent autoencoder, and/or the like.

Before optimal parameters are determined (i.e., the tuned parameters), the output of applying the mapping function having the tunable parameters to the training LQ data sample may produce a training output that is not of the desired quality as the HQ data output. Therefore, in various embodiments, processor 120 may compare the first training output to the first training HQ data sample (i.e., the desired output from second recorder 160) (step 212). Processor 120 may calculate a difference between the first training output and the first training HQ data sample (step 214). The difference between the first training output and the first training HQ data sample may be, in various embodiments, a single value difference or an absolute difference, a mean squared difference, or the like. In various embodiments, the difference may be a distribution difference between an output distribution difference of the first training output and a high quality data sample distribution of values of the first high quality data sample. The distribution difference may reflect the difference in the distribution of first training output data points and first training HQ data points. In other words, the distribution difference may be a statistical difference reflecting how well the distribution of first training output data points matches the distribution of the training HQ data points. The distribution difference may be measured via the use of an adversarial loss or a divergence metric.

Based on the calculated difference, processor 120 may adjust the tunable parameters (216) to decrease the difference calculated between the first training output and the first training HQ data sample. As an example, the first training output may be a modified version of the still image captured by first recorder 140, but it is still different than the HQ still image from second sensor 160. Therefore, the tunable parameters of the mapping function may be adjusted such that when the adjusted tunable parameters of the mapping function are applied to the training LQ data sample, the resulting training output has a value (which may result from the single number value determined by the non-linear mappings) that is closer to a value associated with the first training HQ data sample (the HQ still image). In other words, the training output (output still image) may more closely resemble the first training HQ data sample (HQ still image).

In various embodiments, comparing the first training output to the training HQ data sample may be completed at the data point level. Accordingly, comparing the first training output to the training HQ data sample may comprise processor 120 comparing the first training output data point (the data point of the first training output produced by processor 120 applying the first tunable parameter, or first set of tunable parameters, to the first training LQ data input) with a corresponding first HQ data point (of the first HQ data sample). In various embodiments, the single number values determined by the non-linear mappings may be compared. Processor 120 may also, as this is an iterative process, compare a second and/or third training output data point (other data points of the first training output) with a corresponding second and/or third HQ data points (of the first HQ data sample), and so forth. Similarly, in various embodiments, calculating the difference between the first training output and the training HQ data sample may be completed at the data point level. Accordingly, calculating the difference between the first training output and the training HQ data sample may comprise processor 120 calculating a difference between the first training output data point and the first training HQ data point (e.g., the difference between the single number values resulting from the non-linear mappings). Processor 120 may likewise calculate the differences between the second training output data point and the second training HQ data point, the third training output data point and the third training HQ data point, and so on. In other words, going along with the still image example, processor 120 may be comparing specific data points (e.g., pixel values) of the LQ still image with their corresponding specific data points (values) of the HQ still image.

In response to calculating the differences between training output data points of the training output and training HQ data points of the training HQ data sample, processor 120 may adjust the tunable parameters (and/or the values thereof) on a more precise level (e.g., one tunable parameter or a select group of tunable parameters) rather than adjusting all tunable parameters together. In various embodiments, the contribution of each tunable parameter in the mapping function to the difference between the training output and training HQ data sample is estimated, and each tunable parameter may be adjusted in a direction conducive to decreasing the difference. For instance, if increasing the value of one tunable parameter results in an increased difference between the training output and the corresponding HQ training data input, then the tunable parameter may be decreased. Accordingly, adjusting the tunable parameters may comprise processor 120 adjusting the first (set of) tunable parameter(s) to decrease the difference between the first training output data point(s) and the first training HQ data point(s). For example, applying a first (set of) tunable parameter(s) to a first training LQ data point(s) may result in a first training LQ data output data point(s) comprising a single number value of 100 (which may be one of multiple values), while the corresponding first training HP data output data point(s) may have a single number value of 150 (which may be one of multiple values). Therefore, processor 120 may adjust the first tunable parameter(s) such that the training LQ data output data point(s) may comprise a single number value closer to 150 (i.e., for example, resulting in a still image output that is closer to the desired HQ still image). The adjustment of the first (set of) tunable parameter(s) may not completely eliminate the difference between the first training LQ data output data point(s) and the first training HQ data point(s), because another training LQ data point in another training data sample pair may require the first tunable parameter to be a value different than that required in the first training data sample pair. Likewise, as this process is an iterative process, processor 120 may adjust the second (set of) tunable parameter(s) to decrease the difference between the second training output data point(s) and the second training HQ data point(s), the third (set of) tunable parameter(s) to decrease the difference between the third training output data point(s) and the third training HQ data point(s), and so on.

By conducting steps 210-216 on data points of training LQ data sample (i.e., individual or specific groups of training LQ data inputs), processor 120 is able to more precisely adjust the tunable parameters, by adjusting individual or specific groups of tunable parameters based on the differences calculated between training LQ data inputs and their respective training HQ data points.

In various embodiments, determining the tuned parameters may be an iterative process. Therefore, to continue determining the tuned parameters (step 204), processor 120 may repeat steps 210-216 on additional data sample pairs (e.g., a second data sample pair comprising a second training LQ data sample and a second training HQ data sample, a third data sample pair comprising a third training LQ data sample and a third training HQ data sample, etc.). Adjusting the tunable parameters from the processing of the first data sample pair may have produced first adjusted parameters, and thus, processor 120 may apply the mapping function with the first adjusted parameters to the second data sample pair. Processor 120 may use the further adjusted tunable parameters from processing a previous data sample pair on a subsequent data sample pair to continuously improve the tunable parameters and determine the tuned parameters. Processor 120 may repeat steps 210-216 to continue determining the tuned parameters until the magnitude of the adjustment of the tunable parameters resulting from the difference between the $n^{th}$ training output and the $n^{th}$ training HQ data sample is below a predetermined threshold, and/or steps 210-216 are repeated a predetermined number of times with a predetermined number of data sample pairs. At such a point, processor 120 may have determined the tuned parameters of the mapping function (i.e., the mapping function having the tuned parameters comprising an average single number value, for example, the application of which may result in the best "educated guess" in what a corresponding HQ data sample of a LQ data sample comprises).

Figure 3:
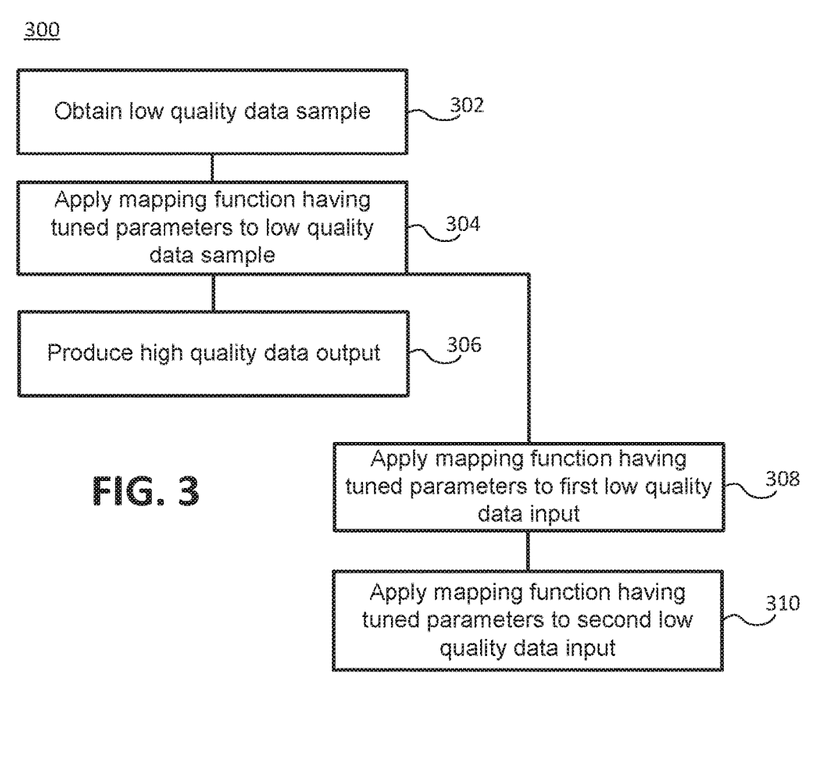
FIG. 3 illustrates a method for applying tuned parameters to a LQ data sample, in accordance with various embodiments.

In response to determining the tuned parameters, sensor system 100 may be utilized to enhance LQ data into HQ data. Once the tuned parameters are determined for enhancing a certain type(s) of data (e.g., video data, time series data (e.g., audio data), still image data, etc.), the mapping function having the tuned parameters may be used for enhancing any LQ data sample comprising that type of data. With combined reference to FIGS. 1A and 3, FIG. 3 depicts a method 300 for applying the mapping function with the tuned parameters (i.e., a tuned mapping function) determined by method 200 in FIG. 2 to a LQ data sample (which may be previously unseen by system 100 and/or processor 120). In various embodiments, processor 120 of sensor system 100 may receive a first LQ data sample (step 302) from first sensor 140 (e.g., a low resolution still image, video recording, audio recording, and/or the like). Processor may apply the tuned mapping function having the tuned parameters to the first LQ data sample (step 304) to produce a first HQ data output (step 306) that may resemble a HQ data sample captured by second sensor 160 (a HQ sensor) of the same environment as that captured by first sensor 140 (a LQ sensor).

In various embodiments, applying the tuned mapping function having the tuned parameters to the first LQ data sample (step 304) (the first LQ data sample being previously unseen by system 100 and/or processor 120) may comprise processor 120 applying the functional mapping with the tuned parameters to a first LQ data input (i.e., a first data point of the first LQ data sample) (step 308) producing a first HQ data output data point (i.e., a first data point of the first HQ data output), applying the mapping function with the tuned parameters to a second LQ data input (i.e., a second data point of the first LQ data sample) (step 310) producing a second HQ data output data point (i.e., a second data point of the first HQ data output), and continuing to apply the functional mapping with the tuned parameters to LQ data inputs up to applying the functional mapping with the tuned parameters to the $n^{th}$ LQ data input (until at least a desired data point, or every data point, of the LQ data sample has been modified by its respective tuned parameter(s)). Accordingly, producing the first HQ data output (step 306) from the processed first LQ data sample may comprise processor 120 combining the first HQ data output data point and the second HQ data output data point, along with any other data output data points produced by the application of the tuned parameters of the mapping function to their respective LQ data inputs.

In various embodiments, each mapping function with a tuned parameter(s) may be configured to enhance the LQ data inputs in various ways. For example, in a visual LQ recording (e.g., a still image or a video recording), one mapping function with a tuned parameter(s) may be configured to recognize and enhance color changes of a LQ data input. Another mapping function with tuned parameter(s) may be configured to recognize and enhance texture of a LQ data input. Yet another mapping function with a tuned parameter(s) may be configured to recognize and enhance various specific items in an image such as a face, or a tree, or a vehicle, etc. Therefore, as an example, for a LQ data input representing a data point of the LQ image comprising a face, the LQ data input may comprise a value(s) that will cause the application of the mapping function with a tuned parameter(s) configured to recognize and enhance faces to produce a HQ data output data point with a higher value than a LQ data input representing a data point of the LQ image without a face.

Returning to the example of the first LQ data sample representing a LQ still image, the production of the first HQ data output, may occur by processor 120 applying the tuned mapping function having the tuned parameters to their respective LQ data inputs (i.e., data points of the LQ still image), producing respective HQ data output data points (i.e., data points of the HQ still image), and in various embodiments, combining the produced HQ data output data points to create the HQ data output (i.e., the HQ still image).

As discussed herein, the LQ data sample to be processed by processor 120 and sensor system 100 may be any type of recording such as a video recording, time series recording (e.g., audio recording), audio/visual recording, still image, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   determining, by a processor, a plurality of tuned parameters of a mapping function, wherein the determining the plurality of tuned parameters comprises:
   initializing, by the processor, a plurality of tunable parameters in the mapping function configured to be applied to a first training low quality data sample comprising a first data quality, wherein the first training low quality data sample is captured by a first sensor type;
   applying, by the processor, the mapping function having the plurality of tunable parameters to a plurality of first training low quality data inputs comprised in the first training low quality data sample, producing a first training output;
   comparing, by the processor, the first training output to a first training high quality data sample associated with the first training low quality data sample, wherein the first training high quality data sample comprises a second data quality that is different than the first data quality, wherein the first training high quality data sample is captured by a second sensor type, wherein the first sensor type and the second sensor type are different;
   calculating, by the processor, a first difference between the first training output and the first training high quality data sample;
   adjusting, by the processor, the plurality of tunable parameters in the mapping function to decrease the first difference between the first training output and the first training high quality data sample, wherein the adjusting the plurality of tunable parameters produces a plurality of first adjusted parameters;
   applying, by the processor, the mapping function having the plurality of first adjusted parameters to a plurality of second training low quality data inputs comprised in a second training low quality data sample, producing a second training output, wherein the second training low quality data sample comprises the first data quality;
   comparing, by the processor, the second training output to a second training high quality data sample associated with the second training low quality data sample, wherein the second training high quality data sample comprises the second data quality;
   calculating, by the processor, a second difference between the second training output and the second training high quality data sample; and
   adjusting, by the processor, the plurality of first adjusted parameters in the mapping function to decrease the second difference between the second training output and the second training high quality data sample.

2. The method of claim 1, wherein the applying the mapping function having the plurality of tunable parameters to the plurality of first training low quality data inputs comprises applying, by the processor, the mapping function to a first training low quality data input, producing a first training output data point.

3. The method of claim 2, wherein the comparing the first training output to the first training high quality data sample comprises comparing, by the processor, the first training output data point to a first training high quality data point comprised in the first training high quality data sample.

4. The method of claim 3, wherein the calculating the first difference comprises calculating, by the processor, a first data point difference between the first training output data point and the first training high quality data point.

5. The method of claim 4, wherein the first difference reflects at least one of a single value difference between the first training output and the first training high quality data sample, and a distribution difference between an output distribution of values of the first training output and a high quality data sample distribution of values of the first high quality data sample.

6. The method of claim 4, wherein the adjusting the plurality of tunable parameters comprises adjusting, by the processor, values of the plurality of tunable parameters in the mapping function to decrease the first data point difference between the first training output data point and the first training high quality data point.

7. The method of claim 1, further comprising applying, by the processor, the mapping function having the plurality of tuned parameters to a low quality data sample, producing a high quality data output, wherein the applying the mapping function having the plurality of tuned parameters to the low quality data sample comprises:
 applying, by the processor, the mapping function having the plurality of tuned parameters to a first low quality data input comprised in the low quality data sample, producing a first high quality data point; and
 applying, by the processor, the mapping function having the plurality of tuned parameters to a second low quality data input comprised in the low quality data sample, producing a second high quality data point, and
 wherein the producing the high quality data output comprises combining, by the processor, the first high quality data point and the second high quality data point, wherein the high quality data output comprises the first high quality data point and the second high quality data point.

8. The method of claim 7, wherein the low quality data sample comprises a recording.

9. The method of claim 8, wherein the recording comprises at least one of a video recording, a time series recording, or a still image recording.

10. A system, comprising:
 a first sensor type configured to record data having a first data quality; and
 a processor in electronic communication with the first sensor type, wherein the processor is configured to perform operations comprising:
 determining, by the processor, a plurality of tuned parameters of a mapping function, wherein the determining the plurality of tuned parameters comprises:
  initializing, by the processor, a plurality of tunable parameters of the mapping function configured to be applied to the first training low quality data sample comprising the first data quality, wherein the first training low quality data sample is captured by the first sensor type;
  producing, by the processor, a first training output by applying the mapping function to a plurality of first training low quality data inputs comprised in the first training low quality data sample;
  comparing, by the processor, the first training output to a first training high quality data sample associated with the first training low quality data sample, wherein the first training high quality data sample comprises a second data quality that is different than the first data quality, wherein the first training high quality data sample is captured by a second sensor type, wherein the first sensor type and the second sensor type are different;
  calculating, by the processor, a first difference between the first training output and the first training high quality data sample;
  adjusting, by the processor, the plurality of tunable parameters in the mapping function to decrease the first difference between the first training output and the first training high quality data sample, wherein the adjusting the plurality of tunable parameters produces a plurality of first adjusted parameters;
  producing, by the processor, a second training output by applying the mapping function having the plurality of first adjusted parameters to a plurality of second training low quality data inputs comprised in a second training low quality data sample, wherein the second training low quality data sample comprises the first data quality;
  comparing, by the processor, the second training output to a second training high quality data sample associated with the second training low quality data sample, wherein the second training high quality data sample comprises the second data quality;
  calculating, by the processor, a second difference between the second training output and the second training high quality data sample; and
  adjusting, by the processor, the plurality of first adjusted parameters in the mapping function to decrease the second difference between the second training output and the second training high quality data sample.

11. The system of claim 10, wherein the operations further comprise: recording, by the first sensor type, a low quality data sample comprising the first data quality; and
 applying, by the processor, the mapping function having the plurality of tuned parameters to the low quality data sample, producing a high quality data output comprising the second data quality.

12. The system of claim 11, wherein the low quality data sample comprises a recording, and wherein the applying the mapping function having the plurality of tuned parameters to the low quality data sample comprises:
 applying, by the processor, the mapping function having the plurality of tuned parameters to a first low quality data input comprised in the low quality data sample, producing a first high quality data point; and
 applying, by the processor, the mapping function having the plurality of tuned parameters to a second low quality data input comprised in the low quality data sample, producing a second high quality data point, and
 wherein the producing the high quality data output comprises combining, by the processor, the first high quality data point and the second high quality data point, wherein the high quality data output comprises the first high quality data point and the second high quality data point.

13. The system of claim 12, wherein the first low quality data input is a first data point of the recording, and the second low quality data input is a second data point of the recording.

14. The system of claim 13, wherein the recording comprises at least one of a video recording, a time series recording, or a still image recording.

15. The system of claim 10, wherein the applying the mapping function having the plurality of tunable parameters to the plurality of first training low quality data inputs comprises applying, by the processor, the mapping function having a first set of tunable parameters of the plurality of tunable parameters to a first training low quality data input, producing a first training output data point, and
 wherein the comparing the first training output to the first training high quality data sample comprises comparing, by the processor, the first training output data point to a first training high quality data point comprised in the first training high quality data sample.

16. The system of claim 15, wherein the calculating the first difference comprises calculating, by the processor, a first data point difference between the first training output data point and the first training high quality data point, and
wherein the adjusting the plurality of tunable parameters comprises adjusting, by the processor, the first set of tunable parameters in the mapping function to decrease the first data point difference between the first training output data point and the first training high quality data point.

17. An article of manufacture including a non-transitory, tangible computer readable storage medium having instructions stored thereon that, in response to execution by a processor, cause the processor to perform operations comprising:
determining a plurality of tuned parameters of a mapping function configured to modify a low quality data sample captured by a first sensor type, wherein the low quality data sample comprises a first data quality; and
applying the mapping function having the plurality of tuned parameters to the low quality data sample to produce a high quality data output comprising a second data quality, wherein the first data quality and the second data quality are different,
wherein the determining the plurality of tuned parameters comprises:
initializing, by the processor, a plurality of tunable parameters in the mapping function configured to be applied to a first training low quality data sample comprising the first data quality, wherein the first training low quality data sample is captured by the first sensor type;
applying, by the processor, the mapping function having the plurality of tunable parameters to a plurality of first training low quality data inputs comprised in the first training low quality data sample, producing a first training output;
comparing, by the processor, the first training output to a first training high quality data sample associated with the first training low quality data sample, wherein the first training high quality data sample comprises the second data quality and is captured by a second sensor type, wherein the first sensor type and the second sensor type are different;
calculating, by the processor, a first difference between the first training output and the first training high quality data sample;
adjusting, by the processor, the plurality of tunable parameters in the mapping function to decrease the first difference between the first training output and the first training high quality data sample, wherein the adjusting the plurality of tunable parameters produces a plurality of first adjusted parameters;
producing, by the processor, a second training output by applying the mapping function having the plurality of first adjusted parameters to a plurality of second training low quality data inputs comprised in a second training low quality data sample, wherein the second training low quality data sample comprises the first data quality;
comparing, by the processor, the second training output to a second training high quality data sample associated with the second training low quality data sample, wherein the second training high quality data sample comprises the second data quality;
calculating, by the processor, a second difference between the second training output and the second training high quality data sample; and
adjusting, by the processor, the plurality of first adjusted parameters in the mapping function to decrease the second difference between the second training output and the second training high quality data sample.

* * * * *